United States Patent
Banerjee

(10) Patent No.: US 9,280,327 B2
(45) Date of Patent: Mar. 8, 2016

(54) SIMPLIFYING DEVELOPMENT OF USER INTERFACES OF APPLICATIONS

(75) Inventor: Udayan Banerjee, Bangalore (IN)

(73) Assignee: NIIT Technologies Ltd, New Delhi (IN)

( * ) Notice: Subject to any disclaimer, the term of this patent is extended or adjusted under 35 U.S.C. 154(b) by 140 days.

(21) Appl. No.: 13/606,047

(22) Filed: Sep. 7, 2012

(65) Prior Publication Data

US 2014/0075347 A1    Mar. 13, 2014

(51) Int. Cl.
*G06F 3/048*  (2013.01)
*G06F 9/44*   (2006.01)

(52) U.S. Cl.
CPC .... *G06F 8/38* (2013.01); *G06F 8/34* (2013.01)

(58) Field of Classification Search
CPC ....................................................... G06F 8/34
USPC .......................................................... 715/763
See application file for complete search history.

(56) References Cited

U.S. PATENT DOCUMENTS

| | | | |
|---|---|---|---|
| 6,941,520 B1 | 9/2005 | Lewallen | |
| 7,269,795 B2 | 9/2007 | Whittenberger | |
| 7,392,483 B2* | 6/2008 | Wong et al. | 715/746 |
| 7,451,403 B1 | 11/2008 | Srinivasan et al. | |
| 7,546,543 B2* | 6/2009 | Louch et al. | 715/762 |
| 7,827,496 B2 | 11/2010 | Dorn et al. | |
| 8,291,408 B1* | 10/2012 | Czymontek | 717/178 |
| 8,458,596 B1* | 6/2013 | Malks et al. | 715/742 |
| 8,458,605 B2* | 6/2013 | Klask et al. | 715/763 |
| 2003/0184584 A1* | 10/2003 | Vachuska et al. | 345/762 |
| 2005/0071803 A1 | 3/2005 | Cherdron et al. | |
| 2005/0091584 A1* | 4/2005 | Bogdan et al. | 715/514 |
| 2005/0198610 A1 | 9/2005 | Fildebrandt | |
| 2006/0212790 A1* | 9/2006 | Perantatos et al. | 715/501.1 |
| 2007/0101279 A1* | 5/2007 | Chaudhri et al. | 715/762 |
| 2008/0148163 A1* | 6/2008 | Charboneau et al. | 715/762 |
| 2009/0055758 A1* | 2/2009 | Sim et al. | 715/762 |
| 2009/0183092 A1* | 7/2009 | Naghshineh | 715/762 |
| 2009/0293004 A1* | 11/2009 | Emam et al. | 715/762 |

(Continued)

FOREIGN PATENT DOCUMENTS

GB    2478971 A    9/2011

OTHER PUBLICATIONS

Introducing Sencha Architect 2, http://docs.sencha.com/architect/2-0/#!/guide/intro, Downloaded circa May 7, 2012, pp. 1-4.

(Continued)

*Primary Examiner* — Jennifer To
*Assistant Examiner* — Sunil Sundar
(74) *Attorney, Agent, or Firm* — IPHorizons PLLC; Narendra Reddy Thappeta

(57) ABSTRACT

An aspect of the present invention simplifies development of user interfaces of applications. In one embodiment, specifications of user interfaces provided by applications are maintained, each specification containing interface definitions of UI elements in the corresponding user interface. A first user interface of a first application and a second user interface of a second application are displayed on a display unit. In response to receiving from a developer, an indication that a first UI element from the first user interface and a second UI element from the second user interface elements are to be included in a new user interface of a new application, a new specification for the new user interface incorporating the interface definitions of the first and second UI elements is created.

17 Claims, 13 Drawing Sheets

(56) References Cited

U.S. PATENT DOCUMENTS

| | | | |
|---|---|---|---|
| 2010/0070968 A1* | 3/2010 | Poulsen et al. | 717/174 |
| 2010/0071026 A1* | 3/2010 | Poulsen et al. | 726/1 |
| 2010/0130261 A1* | 5/2010 | Weisscher et al. | 455/566 |
| 2010/0153865 A1* | 6/2010 | Barnes et al. | 715/762 |
| 2010/0162143 A1* | 6/2010 | Abou et al. | 715/762 |
| 2011/0119603 A1* | 5/2011 | Peltz et al. | 715/762 |
| 2011/0119618 A1* | 5/2011 | Nestler et al. | 715/781 |
| 2012/0005577 A1* | 1/2012 | Chakra et al. | 715/702 |
| 2012/0023479 A1 | 1/2012 | Moress | |
| 2012/0110482 A1* | 5/2012 | Zhang et al. | 715/762 |
| 2012/0254791 A1* | 10/2012 | Jackson et al. | 715/781 |
| 2012/0290955 A1* | 11/2012 | Quine | 715/763 |
| 2012/0290959 A1* | 11/2012 | Quine | 715/765 |
| 2013/0159892 A1* | 6/2013 | Suraj et al. | 715/762 |
| 2013/0198610 A1* | 8/2013 | Mokhtarzada et al. | 715/234 |
| 2013/0198658 A1* | 8/2013 | Mokhtarzada et al. | 715/760 |
| 2014/0019847 A1* | 1/2014 | Osmak | 715/234 |
| 2014/0033084 A1* | 1/2014 | Eismann et al. | 715/763 |

OTHER PUBLICATIONS

New UI Designed From the Ground Up for Tablets, http://developer.android.com/sdk/android-3.0-highlights.html, Downloaded circa May 7, 2012, pp. 1-6.

"Daniel SINNIG1", "Homa Javahery", Peter Forbrig,"Ahmed Seffah", Patterns and Components for Enhancing Reusability and Systematic UI Development, 2005, pp. 1-10.

"Adrian Bridgwater", Tiggzi Plug-In Architecture Builds Api Anthology, http://www.drdobbs.com/architecture-and-design/232700320, Mar. 27, 2012, pp. 1-1.

* cited by examiner

```
<Project>
  <Page type="Initial" title="Customer1" logo="Images\hotel1.png" link="splash" emulator="Nexus" />  ← 410
  <Page id="Splash Screen" type="splash" image="Images\no_image.png" link="hotel_search_screen" />  ← 420
  <Page id="hotel_search_screen" title="Hotel Search" back-color="#102838">
    <block type="input" top-color="#455C6C" bottom-color="#213844" height="32">
      <button id="btn_back" title="Back" font-color="#000000" font-size="9" bold="true" top-color="#FFFFFF"
        bottom-color="#666666" gap="5" pad="4" width="40" height="21" align="left" />
      <label id="lbl_header" title="Search Hotel" font-color="#FFFFFF" font-size="13" bold="true" top="5" width="110" left="19" />
      <button id="btn_home" title="Home" font-color="#000000" font-size="9" bold="true" top-color="#FFFFFF"
        bottom-color="#666666" gap="5" width="40" height="21" align="right" pad="3" />
    </block>
    <block type="radio">
      <radio id="radio1" title="NEAR A LOCATION" checked="true" font-color="#FFFFFC" left="5" height="5" top="20" />
      <radio id="radio2" title="NEAR ME" font-color="#FFFFFC" left="-5" height="5" top="20" />
    </block>
    ...
    <block type="input">
      <button id="btn_reset" title="Reset" top-color="#FFFFFF" bottom-color="#666666" left="80" top="30" onClick="clear" />
      <button id="btn_search" title="Search" top-color="#FFFFFF" bottom-color="#666666" left="150" top="30" link="hotel_search_results"
        onClick = "validate" />
    </block>
  </Page>
  <Page id="hotel_search_results" title="Hotel Search" back-color="#102838">
    <block type="custom_tabular" gap="3" title="Hotel Search" height="110" lines="3" divider="#4C5C6C">
      <image id="img_hotel" image="[Images\hotel1.png][Images\hotel2.png][Images\hotel3.png]" left="10" />
      <button id="btn_details" value="[Details][Details][Details]" bold="true" width="80" top-color="#455C6C"
        bottom-color="#213844" font-color="#FFFFFF" top="4" samecell="" />
      <label id="lbl_text1" value="[ACME Prop1][NIIT Theodore][NIIT Prop4]" bold="true" color="#000000" font-size="13" left="10" top="-4" />
      <button id="btn_availability" value="[Check Availability][Check Availability][Check Availability]" top-color="#FFFFFF"
        bottom-color="#666666" bold="true" width="100" samecell="" />
    </block>
  </Page>
</Project>
```

430  435  445  440

```xml
<Project>
  <Page id="Splash Screen" type="splash" image="Images\splash.png" link="profile" />    ← 470
  <Page id="register" title="Register" background-image="Images\bg.png">
    <block type="input" back-color="#F88E1D" height="31">
      <button id="btn_back" title="Back" font-color="#FFFFFF" font-size="9" bold="true" top-color="#F6701B"
        bottom-color="#FD6D11" gap="5" pad="4" width="40" height="21" align="left" link="profile" />
      <label id="lbl_header" title="Register" font-color="#FFFFFF" font-size="13" bold="true" top="5" width="110" left="19" />
      <button id="btn_submit" title="Submit" font-color="#FFFFFF" font-size="9" bold="true" top-color="#F6701B"
        bottom-color="#FD6D11" gap="5" width="40" height="21" align="right" pad="3" link="profile_landing" />
    </block>
    <block type="input" back-color="#FFCC66" height="35" scroll="">
      <label id="lbl_help" font-color="#000000" font-size="7" pad="5" text-align="left" value="Enter Mobile No and Password ...
        your password click for the Help." />
    </block>
    ...
    <block type="custom_tabular" back-color="#FFFFFF" pad="10" gap="20" border-color="#CCCCCC" border="1,2" model="profile">
      <label id="lbl_card_no" title="Card No:" font-color="#000000" font-size="9" bold="true" width="75" gap="4" left="5" />
      <input id="txt_card_no" font-size="9" sameline="" width="120" gap="2" pad="5" field="card_number" datatype="i(16)*" />
      <label id="lbl_expiry" title="Expiry Date :" font-color="#000000" font-size="9" bold="true" sameline="" width="75" gap="4" />
      <input id="txt_expiry_year" font-color="#000000" font-size="9" bold="true" sameline="" width="55" gap="4" pad="5"
        field="card_expiry_year" weight="0.5" datatype="D(yy)*"/>
      <input id="txt_expiry_month" font-color="#000000" font-size="9" bold="true" sameline="" width="55" gap="4" pad="6"
        field="card_expiry_month" weight="0.5" datatype="D(mm)*"/>
    </block>
    <block type="tab-bar" align="bottom" per-line="4">
      <tab-item id="tab_item_profile" title="Profile" active="" image="Images\profile.png" link="profile" />
      <tab-item id="tab_item_taxi" title="Taxi" image="Images\taxi.png" link="taxi" />
      <tab-item id="tab_item_history" title="History" image="Images\history.png" link="history" />
      <tab-item id="tab_item_help" title="Help" image="Images\help.png" link="help" />
    </block>
  </Page>
  <Page id="profile_landing" title="My Profile" background-image="Images\bg.png">
    <block type="input" back-color="#FFFFFF" height="65" border-color="#CCCCCC" border="1" gap="10" pad="10" scroll="">
      <label id="lbl_help" font-color="#000000" font-size="14" pad="5" text-align="center" value="Your registration is successful.
        You can now edit your profile." width="200" gap="20" />
    </block>
    ...
  </Page>
</Project>
```

```
<Project>
  <Page id="new_screen" title="New Screen" back-color="#102838">
  ...
    <block type="custom_tabular" back-color="#FFFFFF" pad="10" gap="20" border-color="#CCCCCC" border="1.2" model="profile">
      <label id="lbl_card_no" title="Card No." font-color="#000000" font-size="9" bold="true" width="75" gap="4" left="5" />
      <input id="txt_card_no" font-size="9" sameline="" width="120" gap="2" pad="5" field="card_number" datatype="i(16)*"/>
      <label id="lbl_expiry" title="Expiry Date :" font-color="#000000" font-size="9" bold="true" samecell="" width="75" gap="4" />
      <input id="txt_expiry_year" font-color="#000000" font-size="9" bold="true" sameline="" width="55" gap="4" pad="5"
             field="card_expiry_year" weight="0.5" datatype="D(yy)*"/>
      <input id="txt_expiry_month" font-color="#000000" font-size="9" bold="true" sameline="" width="55" gap="4" pad="6"
             field="card_expiry_month" weight="0.5" datatype="D(mm)*"/>
    </block>
    <block type="input">
      <button id="btn_reset" title="Reset" top-color="#FFFFFF" bottom-color="#666666" left="80" top="30" onClick="clear"/>
      <button id="btn_submit" title="Submit" top-color="#FFFFFF" bottom-color="#666666" left="150"
              top="30" link="hotel_search_results" onClick ="validate" />
    </block>
  ...
  </Page>
</Project>
```

620 (brace around first block)
640 (brace around second block)

*FIG. 6*

SIMPLIFYING DEVELOPMENT OF USER INTERFACES OF APPLICATIONS

BACKGROUND OF THE INVENTION

1. Technical Field

The present disclosure relates to software systems, and more specifically to simplifying development of user interfaces of applications.

2. Related Art

A user interface refers to the manner in which a user is enabled to interact with an application. Such interaction typically entails receiving inputs from the user and rendering (displaying, playing sounds, etc.) the outputs generated, typically by processing of the inputs. Applications often have convenient user interfaces, which simplify receiving appropriate inputs (e.g., by various textual/graphical user interface elements) and also providing outputs in a visually/audibly presentable manner.

It is generally desirable that the development of user interfaces of applications be simplified.

BRIEF DESCRIPTION OF THE DRAWINGS

Example embodiments of the present invention will be described with reference to the accompanying drawings briefly described below.

FIGS. 3A-3B together depicts various user interfaces provided by a first application in one embodiment.

FIGS. 4A and 4B respectively depicts portions of specifications of the user interfaces provided by a first and a second application in one embodiment.

FIG. 6 depicts portions of a specification of a newly created user interface of a new application in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention simplifies development of user interfaces of applications. In one embodiment, specifications of user interfaces provided by applications are maintained, each specification containing interface definitions of UI elements in the corresponding user interface. A first user interface of a first application and a second user interface of a second application are displayed on a display unit. In response to receiving from a developer, an indication that a first UI element from the first user interface and a second UI element from the second user interface elements are to be included in a new user interface of a new application, a new specification for the new user interface incorporating the interface definitions of the first and second UI elements is created.

Thus, by facilitating the developer to select the desired UI elements from the user interfaces of different applications, the development of user interfaces of applications is simplified.

Several aspects of the present invention are described below with reference to examples for illustration. However, one skilled in the relevant arts will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
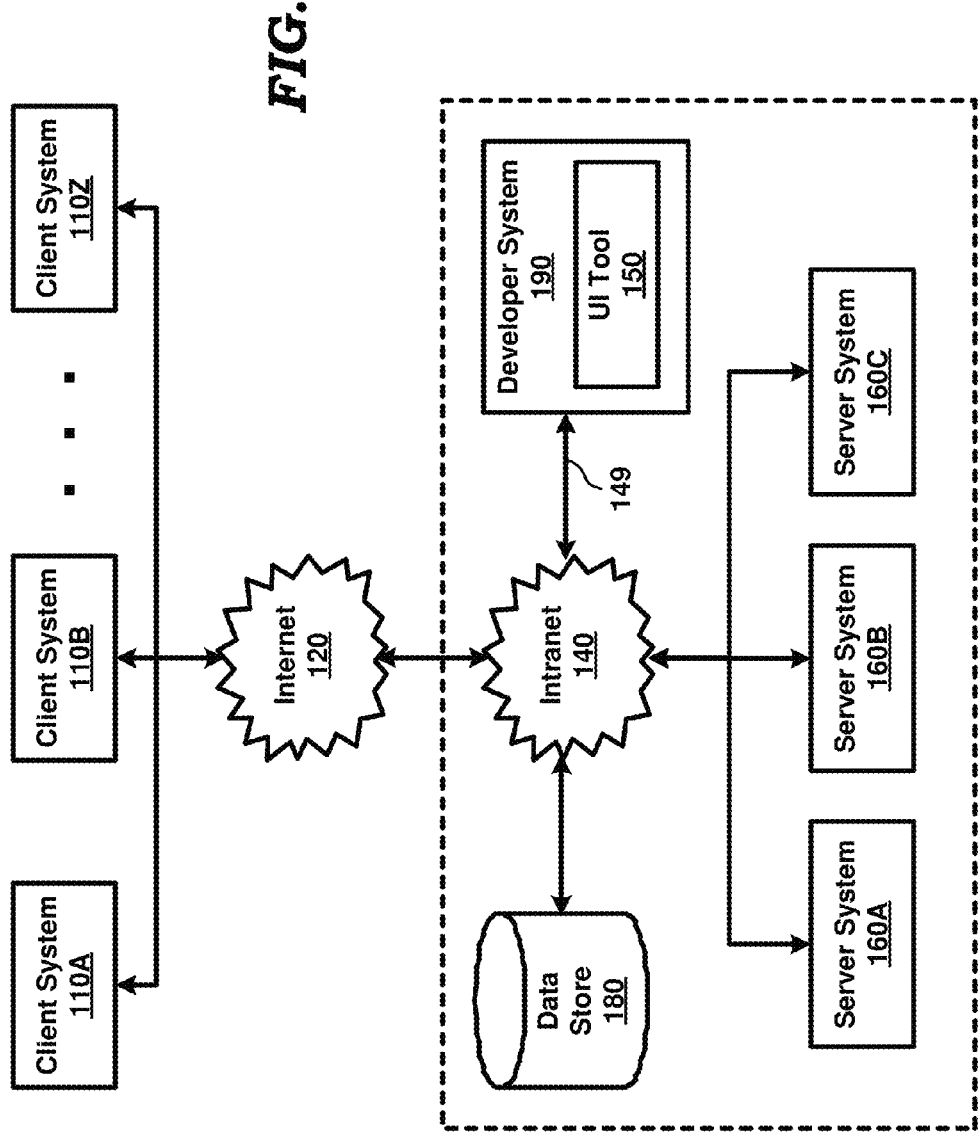
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110Z, Internet 120, intranet 140, server systems 160A-160C, data store 180 and developer system 190 (in turn, shown containing UI tool 150).

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C, data store 180, and developer system 190, all provided within an enterprise or domain (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Data store 180 represents a non-volatile (persistent) storage facilitating storage and retrieval of a collection of data by applications executing in server systems 160A-160C (and also developer system 190). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, tablets, etc., used by users to generate (server) requests directed to applications executing in server systems 160A-

160C. The requests may be generated using appropriate user interfaces (e.g., web pages provided by an application executing in a server system, a native user interface provided by a portion of the application downloaded from the server system, etc.). In general, a client system requests an application for performing desired tasks and receives corresponding responses containing the results of performance of the requested tasks. Each server request is sent in the form of an IP packet directed to the desired server system (and application), with the IP packet including data identifying the desired tasks in the payload portion.

Each of server systems 160A-160C represents a server, such as a web/application server, executing (enterprise) applications capable of performing tasks requested by users using one of client systems 110A-110Z. A server system may use data stored internally (for example, in a non-volatile storage/hard disk within the server system), external data maintained in data store 180 and/or data received from external sources (e.g., from the user) in performing such tasks. The server system then sends the result of performance of the tasks to the requesting client system (one of 110A-110Z). The results may be accompanied by specific user interfaces (e.g., web pages) for displaying the results to the requesting user.

Developer system 190 represents a system such as a personal computer, workstation, mobile station, etc., used by users/developers to create (and/or modify) applications executing in server systems 160A-160C. In particular, developers of an application specify software instructions designed to provide a corresponding user interface and perform specific tasks request by the user using the provided user interface. As is well known, the software instructions are commonly specified using a high-level programming language such as C, C++, Java, C#, etc., with the specified instructions then converted/compiled into executable code (e.g., binary code executed by a processor, intermediate code executed by a virtual machine, etc.) before being deployed on one or more of server systems 160A-160C.

It may be appreciated that in several environments, client systems 110A-110Z may be heterogeneous in terms of the hardware and/or operating systems (such as Microsoft Windows XP operating system, Linux operating system, Google Android operating system, Apple IOS operating system, etc.) pre-installed in the client systems. It may be accordingly be required that different types of applications capable of processing requests from different heterogeneous client systems be created (using developer system 190) and then deployed in server systems 160A-160C. One challenge to creation of a new application (or a modification of an existing application), in particular in heterogeneous (mobile) environments, is the development of the user interfaces of the application.

In one approach, a user interface development environment containing various pre-configured UI elements capable of being selected and placed (on a blank user interface) is provided to the developers. The UI elements may include basic elements such as buttons, text fields, labels, etc. and/or complex elements such as tabs, scroll bars, etc. as is well known in the arts. A developer accordingly constructs a user interface by selecting the desired UI elements and then placing the selected elements at corresponding locations of the user interface. It may be appreciated that the developer in such an environment is restricted to only those UI elements provided by that single user interface development environment.

UI (user interface) tool 150, provided according to several aspects of the present invention, simplifies the development of user interfaces of applications, while overcoming some of the drawbacks noted above. Though UI tool 150 is shown executing in developer system 190, in alternative embodiments, UI tool 150 may be implemented as an independent module external to the systems of FIG. 1. The manner in which UI tool 150 simplifies the development of user interfaces is described below with examples.

3. Simplifying Development of User Interfaces

Figure 2:
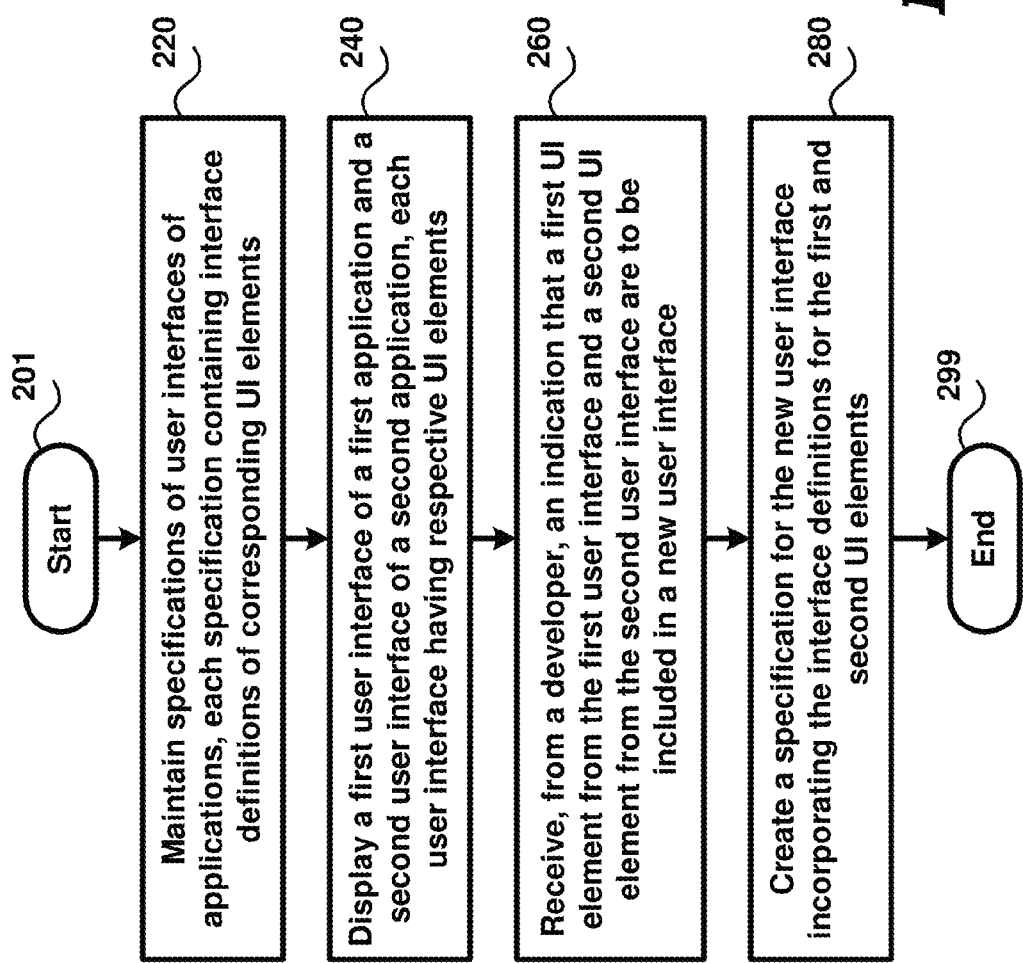
FIG. 2 is a flow chart illustrating the manner in which the development of user interfaces of applications is simplified according to an aspect of the present invention.

FIG. 2 is a flow chart illustrating the manner in which the development of user interfaces of applications is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, UI tool 150 maintains specifications of user interfaces of applications, each specification containing interface definitions of the corresponding UI elements (in the respective user interfaces). An interface definition of a UI element specifies the details of presentation (such as the color, font, width, height, etc.) of the UI element, and also the behavior of the UI element, generally, in terms of the (non-presentation) properties associated with the UI element, the actions that may be performed with respect to the UI element and the events to which the UI element is designed to respond. The specifications may be stored in data store 180, for example, in the form of corresponding files.

In step 240, UI tool 150 displays a first user interface of a first application and a second user interface of a second application, with each user interface having respective UI elements. The user interfaces may be displayed on a display unit (not shown in FIG. 1) associated with developer system 190. Each UI element is rendered on the display unit according to the values of various properties specified in the corresponding interface definition. Furthermore, functionally similar UI elements (e.g., a button) of different applications may be rendered with different visual properties, depending on the interface definition in the corresponding specification (of the user interface of the corresponding application).

It should be noted that each of the first and the second user interfaces are correspondingly provided by the first and second applications when the applications are deployed and executed in server systems 160A-160C. As such, the UI elements (of the corresponding user interfaces) displayed are similar in appearance to what the user may view when publicly accessing (over the Internet) the first and second applications using client systems 110A-110Z.

In step 260, UI tool 150 receives, from a user/developer, an indication that a first UI element from the first user interface and a second UI element from the second user interface are to be included in a new user interface of a new application (being created). It should be noted that the developer selects the first and second UI elements based on the corresponding rendered display of the UI elements. The indication may be received from the developer in a known way, for example, using input devices such as mouse and keyboard to point out the specific UI elements of the first and second user interfaces sought to be included in the new user interface.

In step 280, UI tool 150 creates a (new) specification for the new user interface (of the new application) incorporating the interface definitions for the first and second UI elements. The creation of the new specification may entail retrieving the specifications of the first and second user interface from data store 180, inspecting the retrieved specifications to determine the interface definitions of the first and second UI elements respectively, and then adding the determined definitions in the new specification. The flow chart ends in step 299.

Thus, a developer by iteratively performing the steps of 260 and 280 may choose desired different UI elements from the user interfaces of different applications, and construct a new user interface using the chosen UI elements. The developer may also then implement the (underlying) programming logic to be executed based on the generated user interface.

As may be readily observed, the flow chart operates to take advantage of any UI elements (of different granularities, e.g., basic or complex elements) present in pre-existing applications. The developer may accordingly have a wide choice of UI elements present in different applications. The development of user interfaces of applications is accordingly simplified for the developers.

In an embodiment described below, a developer generates such new user interfaces for new applications based on UI elements of publicly (over the Internet) accessible applications. Thus, a developer and a customer (for whom the new application is being created) can interactively create sample user interfaces for the new application in a short duration. The developer may then implement the underlying programming logic only after the customer has selected and approved one of the sample interfaces. The development time of the new application may be accordingly reduced.

The manner in which UI tool 150 simplifies development of the user interfaces of applications according to the steps of FIG. 2 is described below with respect to such an example development scenario.

4. Illustrative Example

FIGS. 3A-3C, 4A-4B, and 5A-5C together illustrate the manner in which the development of user interfaces of applications is simplified in one embodiment. For illustration, the development of user interface of mobile applications using the UI elements provided by other mobile applications is described in detail below. However, the features of the present invention may be implemented for development of user interface other types (such as desktop, web, etc.) of applications as well, as will be apparent to one skilled in the relevant arts by reading the disclosure herein. Each of the Figures is described in detail below.

Figure 3A:
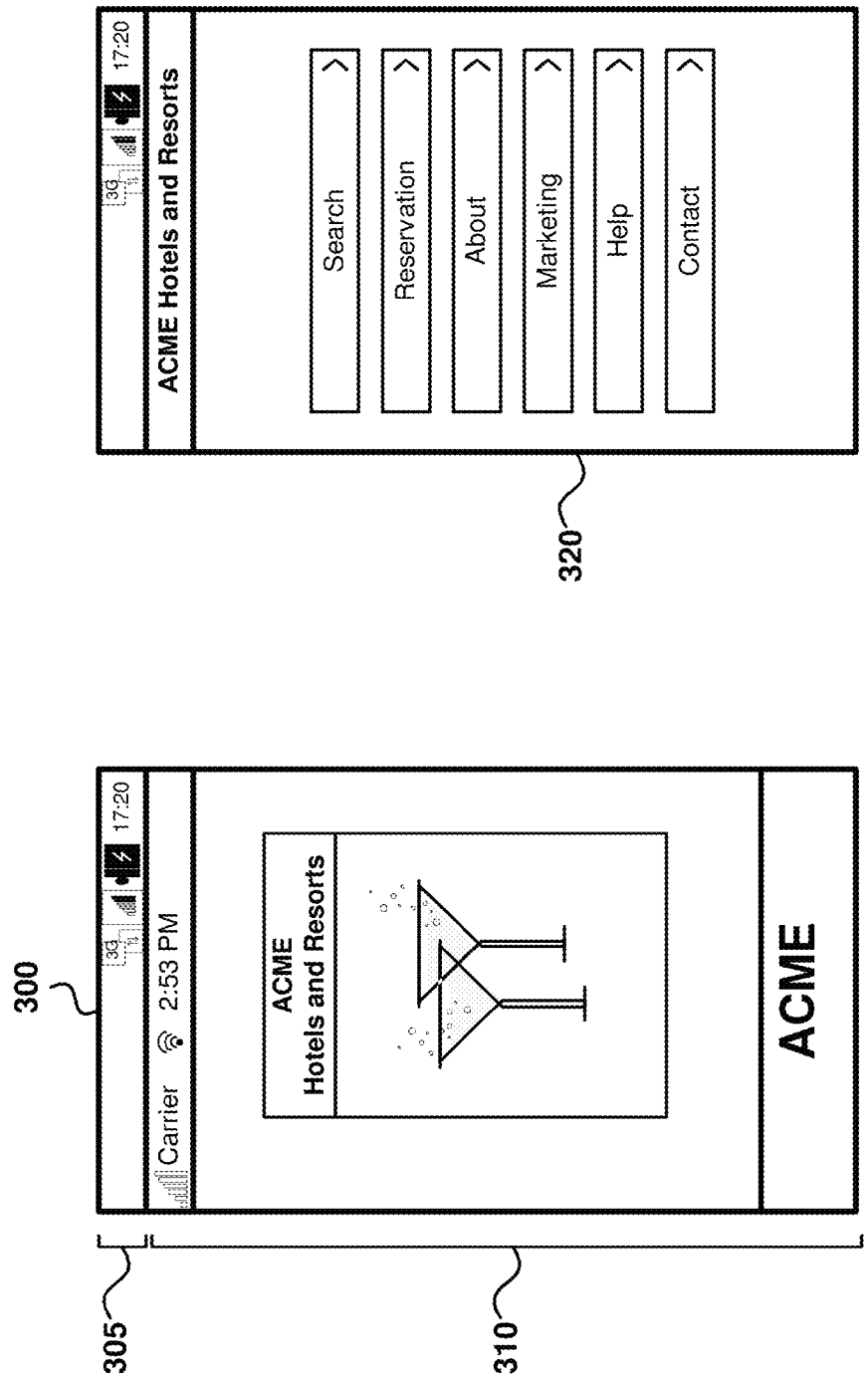
Figure 3B:
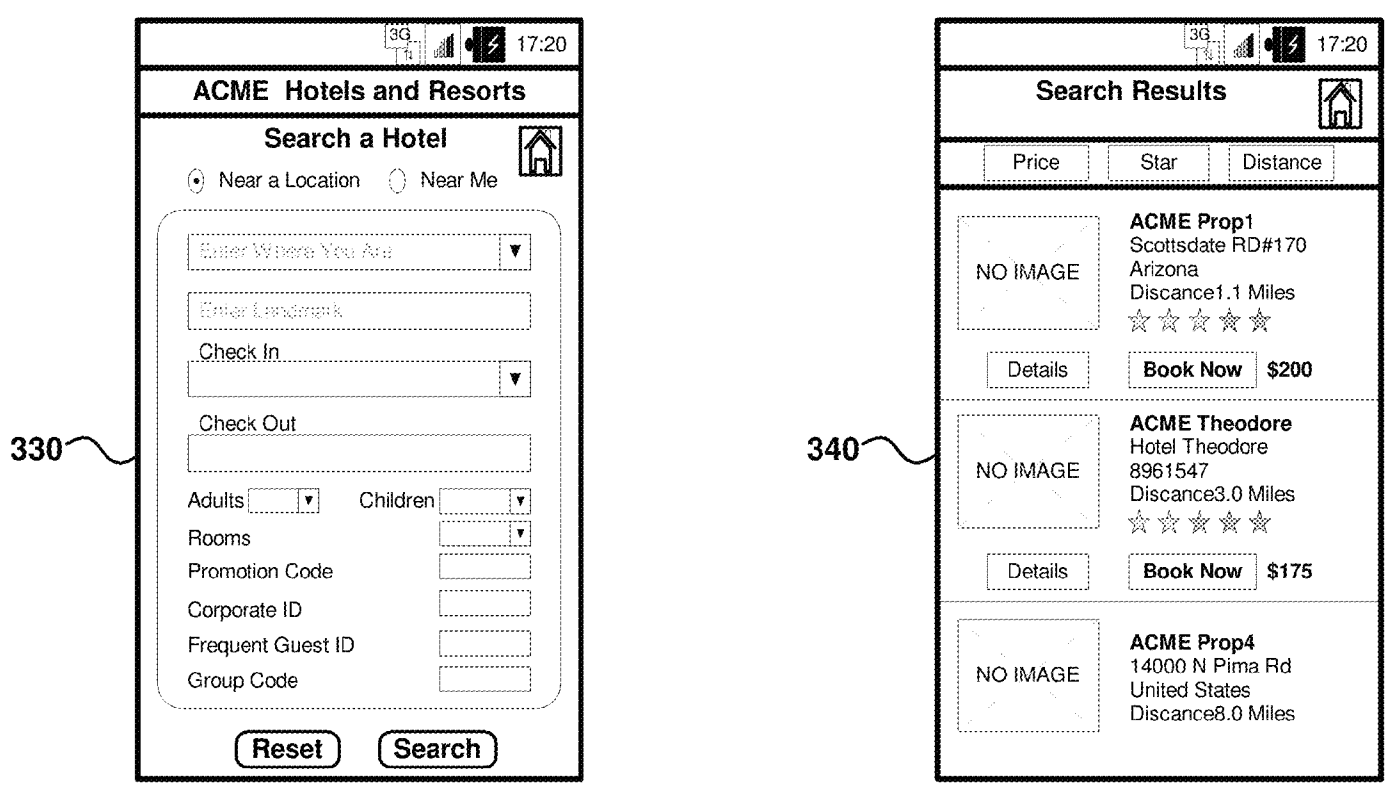
Figure 3C:
FIG. 3C depicts various user interfaces provided by a second application in one embodiment.

FIGS. 3A-3B together depicts various user interfaces provided by a first/hotel reservation application, while FIG. 3C depicts various user interface provided by a second/cab booking application in one embodiment. Referring to FIG. 3A, display area 300 depicts a portion of a user interface displayed on a mobile device (such as a mobile phone, tablet, etc.). Display area 305 is provided by an operating system of the mobile device and displays the status information (such as connectivity, signal strength, battery remaining) and current time. It is noted that in the following description, display area 305 does not form part of the user interfaces provided by the first and second applications.

Display area 310 depicts a portion of a user interface provided by the hotel reservation application. In particular, display area 310 shows a splash/introduction screen, as is well known in the arts. In response to a user clicking on any portion of display area 310, the hotel reservation application displays the menu screen of display area 320, wherein the user may select from one of the provided menu options. Referring to FIG. 3B, display area 330 represents a search screen provided by the hotel reservation application in response to the user selecting the "Search" option (in display area 320). The search screen enables the user to search for a desired hotel. The results of a search performed by the user are displayed in the results screen shown in display area 340.

Referring to FIG. 3C, display area 370 represents a splash/introduction screen provided by a cab booking application. After loading the desired data, the cab application provides the registration screen of display area 380, to facilitate a user to register with the booking system. When a user enters the desired data in the fields shown in display area 380 and clicks the "Submit" button, the cab booking application validates the data and may show the success screen of display area 390 upon successful validation (and correspondingly registration) of the user (data).

It may be appreciated that the first and second application may be developed and deployed for heterogeneous systems, for example, the first application for mobile devices using Google Android operating system, and the second application for mobile devices using Apple iOS operating system. Alternatively, the first and second applications may be developed for a single operating system, but provide different functionalities (e.g., hotel reservation, cab booking, etc.).

Thus, the two different applications provide different user interfaces based on the heterogeneous operating systems for which the applications are designed or based on various functionalities implemented by the application. The user interfaces of FIGS. 3A-3C are captured and maintained as corresponding specifications, as described below with examples.

5. Specifications of User Interfaces

Each of FIGS. 4A and 4B respectively depicts portions of specifications of the user interfaces provided by a first and a second application in one embodiment. The specifications are shown as being maintained according to extensible markup language (XML), for illustration. However, in alternative embodiments, the specifications may be maintained using other data formats such as HTML (hypertext markup language) and/or using other data structures (such as a table in a relational database), as will be apparent to one skilled in the relevant arts by reading the disclosure herein.

In particular, FIG. 4A depicts portions of a specification of the user interfaces (shown in FIGS. 3A-3B) provided by a hotel reservation application, while FIG. 4B depicts portions of specification of the user interfaces (showing in FIG. 3C) provided by a cab booking application in one embodiment.

Referring to FIG. 4A, each of data portions 410, 420, 430 and 440 specifies the interface definitions of the UI elements contained in the respective screens of display area 310, 320, 330 and 340. Each of data portions 435 and 445 specifies a block/collection of UI elements forming part of the screens of FIGS. 3A and 3B.

It may be observed that the interface definitions (as indicated by the XML tags "<button>", "<label>", etc.) are shown specifying various display properties such as color, back-color, title, etc. of the UI element, and also the non-display properties (such as id, type, etc.). In data portion 435, the button UI element having id 'btn_reset' and "btn_search" are shown respectively invoking the methods named "clear" (for clearing the contents of the input fields specified in data portion 430) and "validate" (for validating the inputs provided by a user prior to submitting/sending the inputs for searching). Other methods and events associated with each UI element may similarly be specified (for example, using other XML tags).

Referring to FIG. 4B, each of data portions 470, 480 and 490 specifies the interface definitions of the UI elements contained in the respective screens of display area 370, 380 and 390 (provided by cab booking application). Data portion 485 specifies a block/collection of UI elements forming part of the screens of FIG. 3C. It may be observed in data portion 485 that some of the input elements such as "txt_card_no", "txt_expiry_year" and "txt_expiry_month" are associated with respective validation information such as "i(16)*" (indicating that the field is a required field, due to the presence of the *, and accepts only a 16 digit integer), "D(yy)*" (indicating a required date field accepting only two digit years) and "D(mm)*" (indicating a required date field accepting only two digits corresponding to months).

Thus, UI tool 150 maintains the specifications of the user interfaces of different applications in data store 180. A developer of a new application may thereafter be facilitated to create new user interfaces for the new application based on the existing user interfaces. In one embodiment, the developer is provided a visual tool (similar to a user interface development environment) for creating the desired user interfaces, as described below with examples.

6. Visual Tool

FIGS. 5A-5D together illustrates a visual tool, provided according to several aspects of the present invention, which simplifies development of user interfaces of applications in one embodiment. Display area 500 depicts various portion of a user interface provided as part of the visual tool by UI tool 150 (in response to a user/developer indicating that a new application is sought to be created). Display area 500 may be displayed on a display unit (not shown in FIG. 1) associated with developer system 190.

Figure 5A:
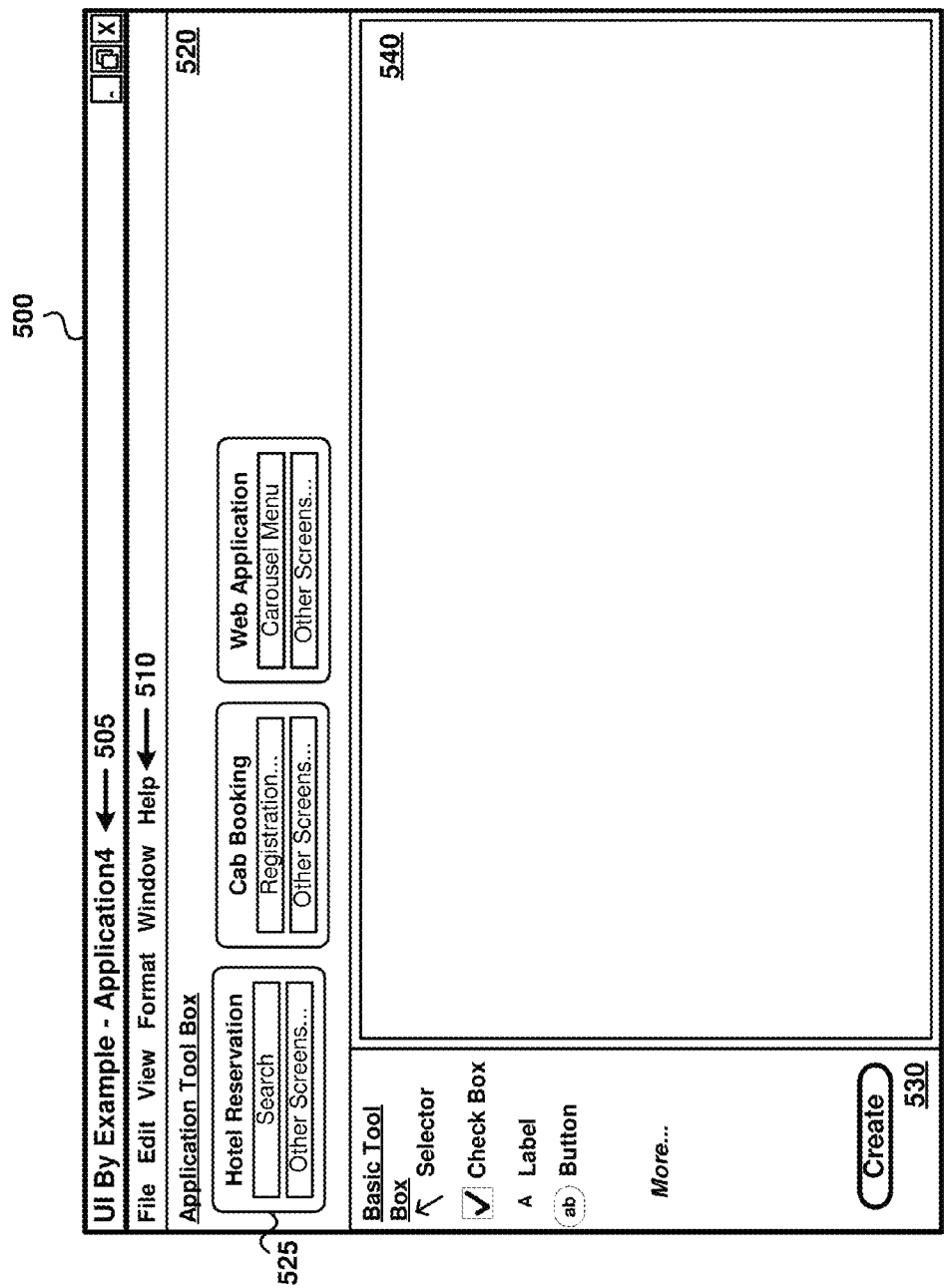
FIGS. 5A-5D together illustrates a visual tool, provided according to several aspects of the present invention, which simplifies development of user interfaces of applications in one embodiment.

Referring to FIG. 5A, display area 505 indicates the name of the visual tool as "UI By Example", and the name of the new application (being created) as "Application4". Display area 510 provides various menu options that may be used by the developer during the creation of the new application "Application4".

Display area 520 displays the currently available user interfaces of applications, in particular, for which corresponding specifications are maintained (e.g. stored in data store 180). UI tool 150 may accordingly retrieve the specifications of the user interfaces of each application, determine the various distinct user interfaces or pages (as identified by the XML tag "page") and then display the determined pages as corresponding selectable options in display area 520.

Display area 525 depicts one such selectable option corresponding to the hotel reservation application, where the name of the application is shown in a box, and the various user interfaces/pages (such as search screen of display area 320) provided by the application are shown as selectable options within the box. Similar display areas corresponding to the cab booking application (noted above) and a web application is also shown as part of display area 520. For illustration, only a single screen is shown as selectable, with other screens being made available only when the user selects the "Other Screens" option. However, in alternative embodiments, any number of screens may be shown as selectable.

Display area 530 displays various basic/complex UI elements that can be added to the new user interface, similar to the user interface development environment noted above. It should be appreciated that such a basic tool box is provided for making minor modifications to the new user interface, after the developer has selected and incorporated various UI elements from multiple applications (using the application tool box shown in display area 520).

Display area 540 represents a "canvas" in which the developer may incorporate the desired UI elements for creating the new user interface of the new application. The canvas is shown empty indicating that the user has not incorporated any UI elements. The developer may accordingly select a user interface of an application (by selecting/clicking the corresponding selectable option in display area 520) for selecting the desired UI elements, as described below with examples.

7. Selecting UI Elements

Figure 5B:
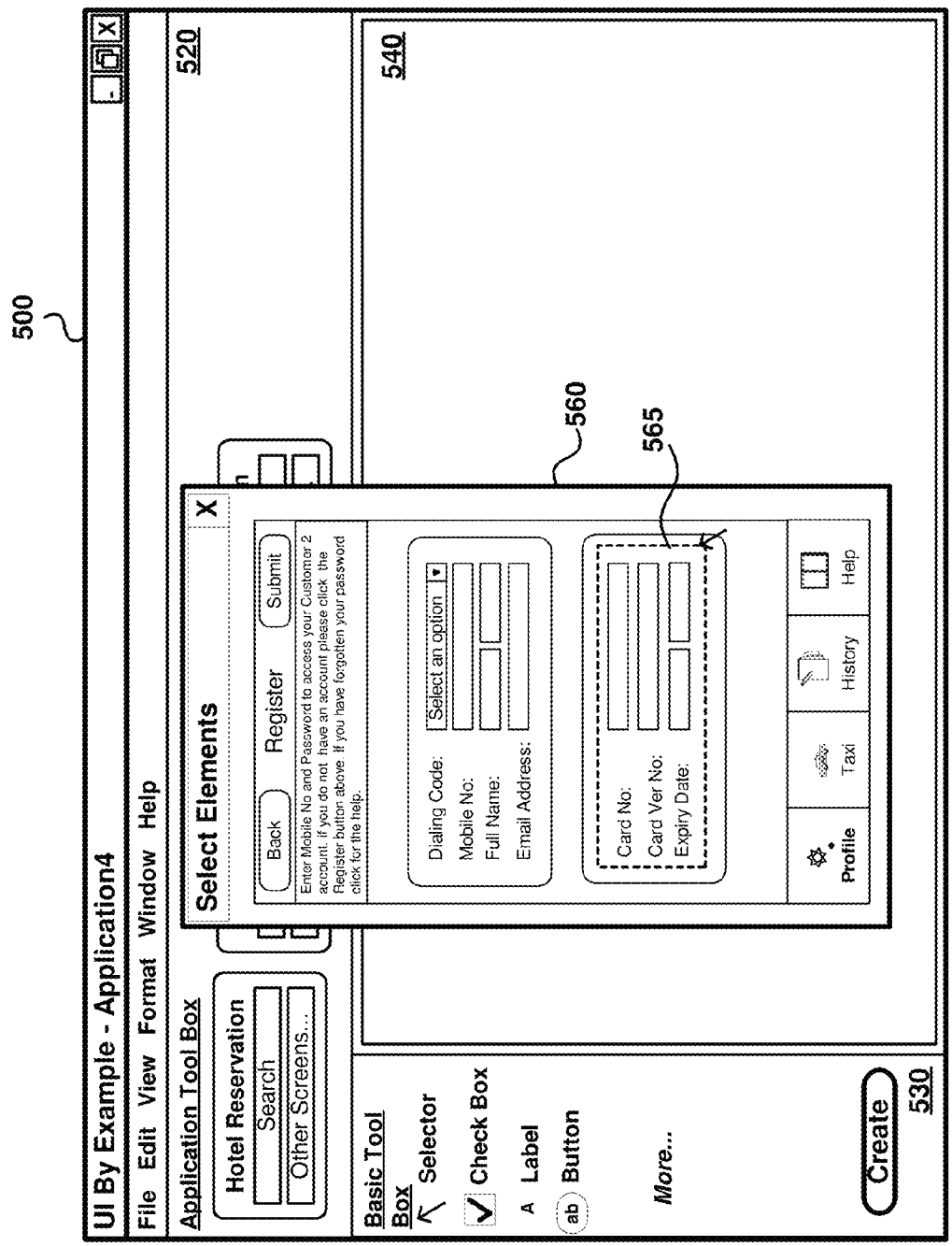

Referring to FIG. 5B, display area 560 represents a portion of a screen displayed by UI tool 150, in response to a user selecting/clicking a selectable option in display area 520. In particular, display area 560 is displayed in the form of a pop-up window (overlaying display area 500) which shows the user interface corresponding to selectable option clicked by the developer. Display area 560 is shown displaying the user interface of display area 380, in response to the user selecting the "Registration" selectable option in the Cab Booking box in display area 520.

The developer may thereafter select the specific UI elements from the interface of display area 560. The selection of the specific UI elements may be performed in a known way, for example, by clicking on the elements sought to be selected. Alternatively, the different UI elements that can be selected may be shown highlighted, with the user clicking on the highlighted portion to select the corresponding UI element. In the present embodiment, a developer drags the mouse pointer to create a selection (as indicated by the dotted rectangle 565) around the outside of all the UI elements that the developers want to include in the selection. Thus, display area 560 indicates that the developer has selected all the UI elements in dotted rectangle 565 for incorporation in the new user interface.

The developer may similarly select other UI elements from the other user interfaces provided by the different applications. It may be appreciated in a scenario that multiple user interfaces of an application are closely associated, for example, a search page and a search results page, it may be desirable that the developer be provided the option of selecting the pages and also the UI elements.

Figure 5C:
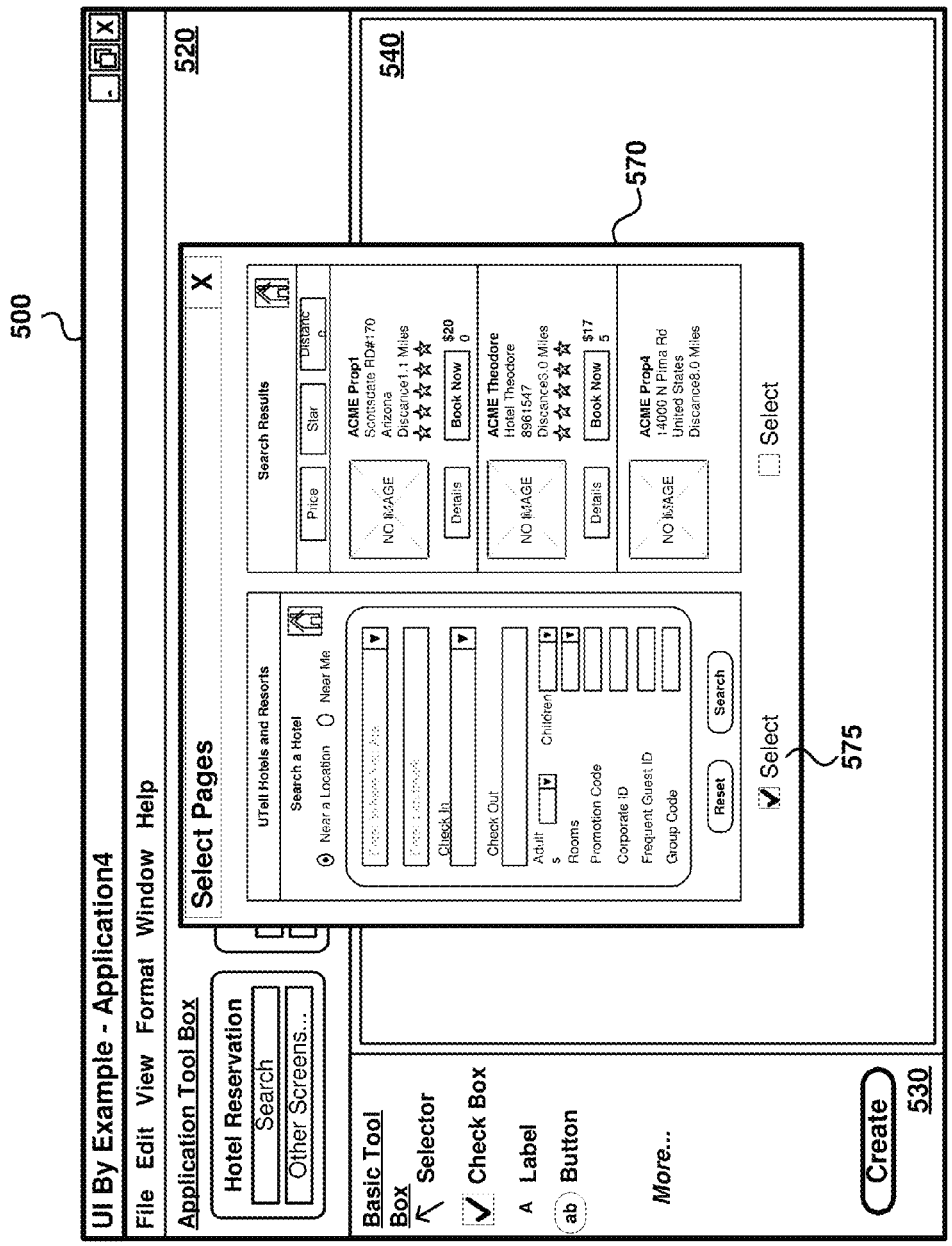

Referring to FIG. 5C, display area 570 represents a pop-up window that enables developer to select the desired page(s) from closely associated pages/user interfaces. Display area 570 is shown displaying the display areas of 330 and 340 (search screen and results screen respectively), in response to the user selecting the "Search" selectable option in the Hotel Reservation box in display area 520. The developer may select both the pages (by checking the Select check boxes 575 shown below each page) to indicate that all the UI elements and functionality contained in both the pages are to be incorporated in the new user interface.

Alternatively, the developer may select a single page, and then select the specific UI elements contained in the selected page using the interface of display area 570. The description is continued assuming that the developer selected the search page in display area 570 and thereafter selected the "Reset" and "Search" button elements from the search page.

8. Constructing a New User Interface

Figure 5D:
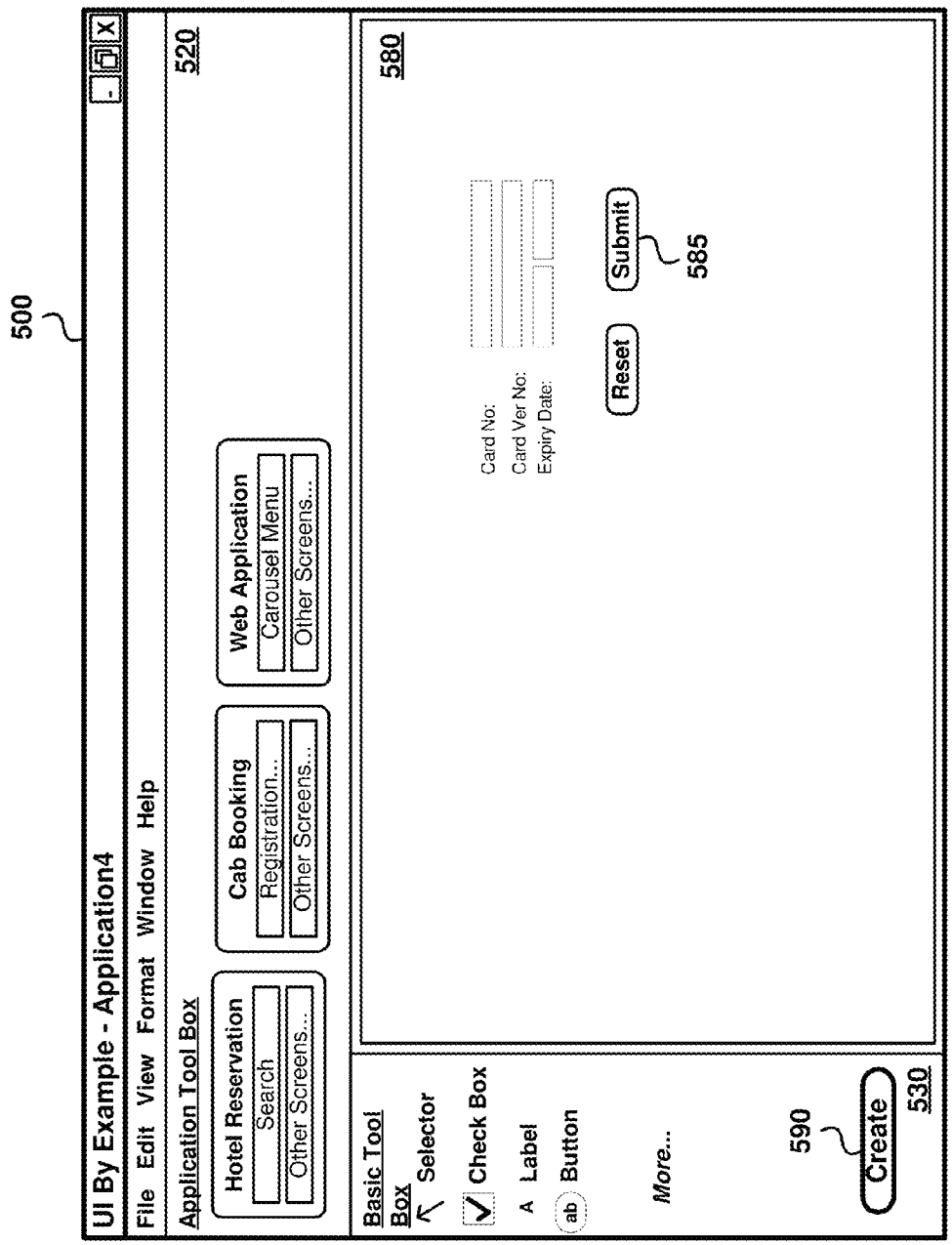

Referring to FIG. 5D, display area 580 depicts the "canvas" updated with the selections made by the developer. In particular, display area 580 is shown containing the UI elements included in selection 560 from the registration screen of the cab booking application (as shown in FIG. 5B), and the "Reset" and "Search" button elements from the search screen of the hotel reservation application.

As noted above, when a UI element is included in a new user interface, the display/non-display properties, methods and events of the UI element as customized for the application (from which the UI element is selected), may also be incorporated in the new specification. For example, the values of the properties, methods and events associated with the "Reset" and "Search" buttons in the user interface of the hotel reservation application may also be incorporated into the specification. The developer, by selecting the appropriate (button) UI element, is relieved of the task of constructing the desired UI element from the basic (button) UI element provide by a user interface development environment.

The developer may thereafter change the display properties (such as the location, width, height, etc.) and other methods/events associated with the selected UI elements. For example, display area 580 indicated that the developer has changed the label of the incorporated "Search" button element 585 to "Submit". A developer may select and incorporate desired UI elements from other user interfaces provided by different applications, and thereafter construct a new user interface using the selected UI elements. After the desired new user interface is constructed, the developer may click on "Create" button 590 to create the specification for the new user interface by incorporating the interface definitions for the selected UI elements.

FIG. 6 depicts portions of a (new) specification of a newly created user interface (portions of which are shown in display area 580) in one embodiment. It may be observed that data portion 620 is similar to data portion 485 (of FIG. 4B), and is included in the new specification in response to the developer indicating selection 570. Data portion 640 is similar to data portion 435 (of FIG. 4A), but with the "Search" button element changed to the "Submit" button element, and is included in the new specification in response to the user selecting the button elements from the search screen. The new specification may similarly incorporate the interface definitions of other selected UI elements.

Thus, a developer using the interfaces of FIGS. 5A-5D is facilitated to select the desired UI elements and to create a new user interface containing the selected UI elements. The developer after creating the new specification corresponding to the new user interface may thereafter implement the desired programming logic as part of the new application.

It may be appreciated that the new specification may be added to the set of specifications maintained in step 220. The new user interface may accordingly be displayed in the list of user interfaces shown in display area 520. A developer may thereafter create another new interface by incorporating the desired UI elements from the new interface (for example, the modified button UI element named "Submit" in data portion 640) and one of the other interfaces (not shown in display area 520). UI tool 150 may accordingly create another new specification corresponding to the another new user interface by including the interface definitions of the desired UI elements.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 7:
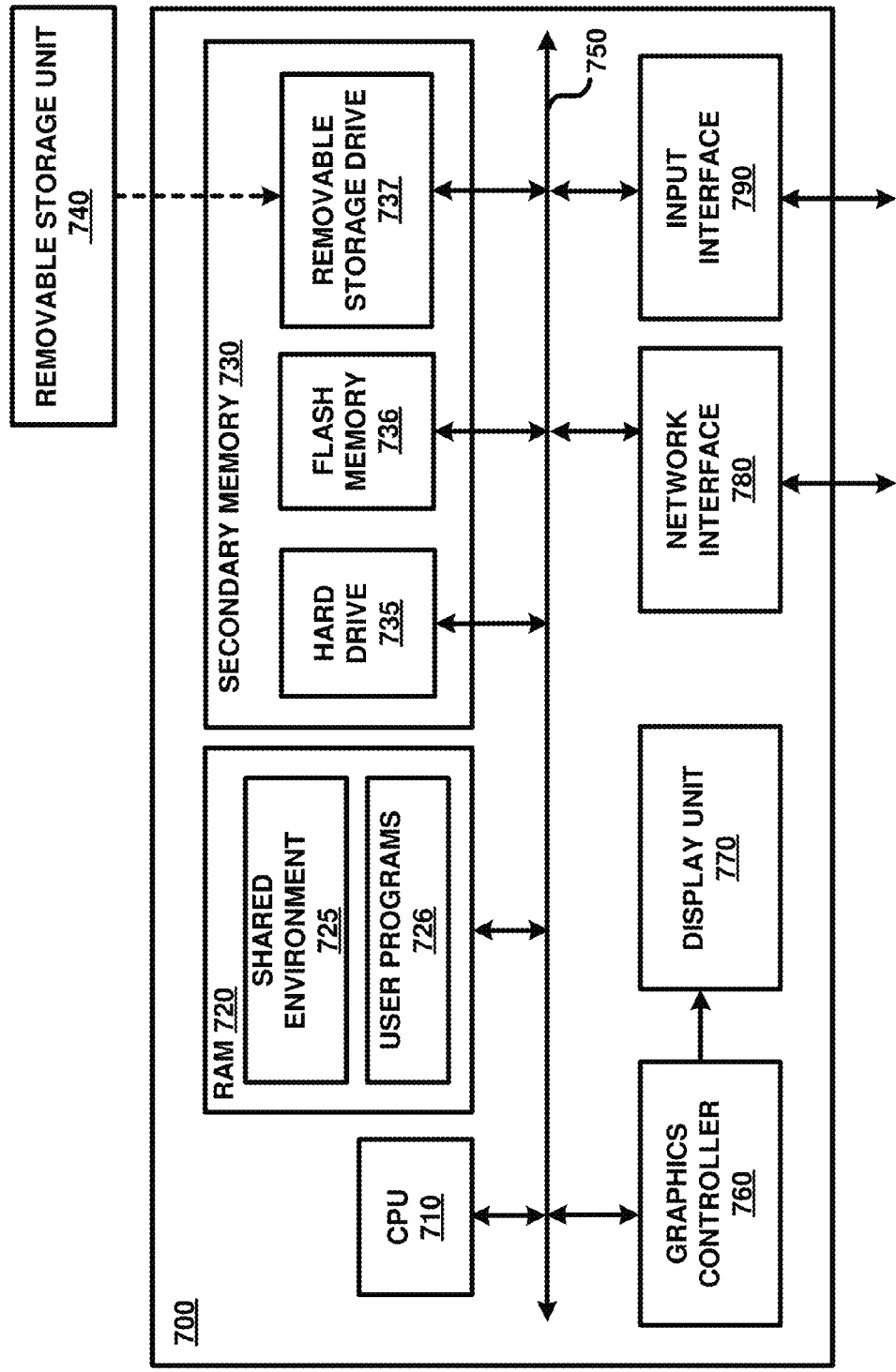
FIG. 7 is a block diagram illustrating the details of a digital processing system in which various aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to any system (such as developer system 190) executing UI tool 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains one or more display screens (providing a unified display interface) to display the images defined by the display signals (such as the portions of the user interfaces shown in FIGS. 3A-3C and 5A-5D). Input interface 790 may correspond to a keyboard and a pointing device (e.g., touch-pad, mouse) and may be used to provide the user inputs (such as the inputs, for example, selection of UI elements, specified in the portions of the user interface shown in FIGS. 5A-5D) required for several aspects of the present invention. Network interface 780 provides connectivity to a network (e.g., using Internet Protocol), and may be used to communicate with other connected systems (such as client systems 110A-110Z, server systems 160A-160C, data store 180, etc.) of FIG. 1.

Secondary memory 730 may contain hard drive 735, flash memory 736, and removable storage drive 737. Secondary memory 730 may store the data (for example, portions of the specifications shown in FIGS. 4A-4B and 6) and software instructions (for example, for performing the steps of FIG. 2), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of simplifying development of user interfaces of applications, said method comprising:
   maintaining a plurality of specifications of user interfaces provided by a plurality of applications, each of said plurality of specifications containing interface definitions of all of a corresponding set of UI (user interface) elements in the respective user interface, said plurality of specifications containing a first specification and a second specification respectively of a first user interface and a second user interface provided by a first application of said plurality of applications,
   wherein said second user interface is identified by a second identifier, wherein said first specification contains a link to said second identifier associated with an UI element to indicate that said second user interface is designed to be accessible from said first user interface based on a user action associated with said UI element of said first user interface, wherein said second specification is rendered to provide said second user interface upon said user action associated with said UI element in said first user interface;
   receiving from a developer, input data indicating selection of said first user interface;
   inspecting, in response to said receiving, said first specification to determine that said second user interface is accessible from said first user interface based on said link;
   displaying on a display unit, in response to only said input data, both of said first user interface and said second user interface in view of said second user interface being determined to be accessible from said first user interface, said first user interface having a first set of UI elements and said second user interface having a second set of UI elements, wherein said first set of UI elements and said second set of UI elements are selectable for inclusion in development of new user interfaces in response to only said input data;
   receiving, from said developer, a first indication that a first UI element from said first set of UI elements and a second UI element from said second set of UI elements are to be included in a new user interface of a new application, wherein said first indication is generated upon said developer selecting said first UI element and said second UI element displayed on said display unit; and
   creating a new specification for said new user interface incorporating the interface definitions of said first UI element and said second UI element, the interface definitions of said first UI element and said second UI element being retrieved respectively from said first specification and said second specification,
   wherein said receiving further receives a second indication that all UI elements of said first user interface are to be included in said new user interface,
   in response to said second indication, said creating incorporating in said new specification the interface definitions of all of said first set of UI elements retrieved from said first specification.

2. The method of claim 1, further comprising:
   enabling said developer to edit at least one display property of said first UI element to form a modified UI element; and
   updating said new specification to include the interface definition of said modified UI element.

3. The method of claim 2, wherein said one display property is one of height, width, color, font and location of said first UI element.

4. The method of claim 2, further comprising adding said new specification in said plurality of specifications and said new application in said plurality of applications,
   wherein said displaying displays on said display unit, said new user interface and a fifth user interface of a fifth application of said plurality of applications, said new interface having a fourth set of UI elements including said modified UI element and said fifth user interface having a fifth set of UI elements,
   wherein said receiving further receives, from said developer, a second indication that said modified UI element from said fourth set of UI elements and a fifth UI element from said fifth set of UI elements are to be included in another new user interface of another new application,
   wherein said creating creates another new specification for said another new user interface incorporating the interface definitions of said modified UI element and said fifth UI element, the interface definitions of said modified UI element and said fifth UI element being retrieved respectively from said new specification and a fifth specification of said plurality of specifications.

5. The method of claim 4, wherein said maintaining maintains said plurality of specifications according to a common format.

6. The method of claim 5, wherein said common format is according to extensible markup language (XML).

7. A non-transitory machine readable medium storing one or more sequences of instructions for causing a developer system to simplify development of user interfaces of applications, wherein execution of said one or more instructions by one or more processors contained in said developer system causes said developer system to perform the actions of:

maintaining a plurality of specifications of user interfaces provided by a plurality of applications, each of said plurality of specifications containing interface definitions of all of a corresponding set of UI (user interface) elements in the respective user interface, said plurality of specifications containing a first specification and a second specification respectively of a first user interface and a second user interface provided by a first application of said plurality of applications, wherein said second user interface is identified by a second identifier, wherein said first specification contains a link to said second identifier associated with an UI element to indicate that said second user interface is designed to be accessible from said first user interface based on a user action associated with said UI element of said first user interface, wherein said second specification is rendered to provide said second user interface upon said user action associated with said UI element in said first user interface;

receiving from a developer, input data indicating selection of said first user interface;

inspecting, in response to said receiving, said first specification to determine that said second user interface is accessible from said first user interface based on said link;

displaying on a display unit, in response to only said input data, both of said first user interface and said second user interface in view of said second user interface being determined to be accessible from said first user interface, said first user interface having a first set of UI elements and said second user interface having a second set of UI elements, wherein said first set of UI elements and said second set of UI elements are selectable for inclusion in development of new user interfaces in response to only said input data;

receiving, from said developer, a first indication that a first UI element from said first set of UI elements and a second UI element from said second set of UI elements are to be included in a new user interface of a new application, wherein said first indication is generated upon said developer selecting said first UI element and said second UI element displayed on said display unit; and creating a new specification for said new user interface incorporating the interface definitions of said first UI element and said second UI element, the interface definitions of said first UI element and said second UI element being retrieved respectively from said first specification and said second specification, wherein said receiving further receives a second indication that all UI elements of said first user interface are to be included in said new user interface, in response to said second indication, said creating incorporating in said new specification the interface definitions of all of said first set of UI elements retrieved from said first specification.

8. The non-transitory machine readable medium of claim 7, further comprising one or more instructions for:

enabling said developer to edit at least one display property of said first UI element to form a modified UI element; and updating said new specification to include the interface definition of said modified UI element.

9. The non-transitory machine readable medium of claim 8, wherein said one display property is one of height, width, color, font and location of said first UI element.

10. The non-transitory machine readable medium of claim 8, further comprising one or more instructions for adding said new specification in said plurality of specifications and said new application in said plurality of applications, wherein said displaying displays on said display unit, said new user interface and a fifth user interface of a fifth application of said plurality of applications, said new interface having a fourth set of UI elements including said modified UI element and said fifth user interface having a fifth set of UI elements, wherein said receiving further receives, from said developer, a second indication that said modified UI element from said fourth set of UI elements and a fifth UI element from said fifth set of UI elements are to be included in another new user interface of another new application, wherein said creating creates another new specification for said another new user interface incorporating the interface definitions of said modified UI element and said fifth UI element, the interface definitions of said modified UI element and said fifth UI element being retrieved respectively from said new specification and a fifth specification of said plurality of specifications.

11. The non-transitory machine readable medium of claim 10, wherein said maintaining maintains said plurality of specifications according to a common format.

12. The non-transitory machine readable medium of claim 11, wherein said common format is according to extensible markup language (XML).

13. A digital processing system comprising:

a processor;

a random access memory (RAM);

a machine readable medium to store one or more instructions, which when retrieved into said RAM and executed by said processor causes said digital processing system to simplify development of user interfaces of applications, said digital processing system performing the actions of:

maintaining a plurality of specifications of user interfaces provided by a plurality of applications, each of said plurality of specifications containing interface definitions of all of a corresponding set of UI (user interface) elements in the respective user interface, said plurality of specifications containing a first specification and a second specification respectively of a first user interface and a second user interface provided by a first application of said plurality of applications, wherein said second user interface is identified by a second identifier, wherein said first specification contains a link to said second identifier associated with an UI element to indicate that said second user interface is designed to be accessible from said first user interface based on a user action associated with said UI element of said first user interface, wherein said second specification is rendered to provide said second user interface upon said user action associated with said UI element in said first user interface;

receiving from a developer, input data indicating selection of said first user interface;

inspecting, in response to said receiving, said first specification to determine that said second user interface is accessible from said first user interface based on said link;

displaying on a display unit, in response to only said input data, both of said first user interface and said second user interface in view of said second user interface being determined to be accessible from said first user interface, said first user interface having a first set of UI elements and said second user interface having a second set of UI elements, wherein said first set of UI elements and said second set of UI elements are selectable for inclusion in development of new user interfaces;

receiving, from said developer, a first indication that a first UI element from said first set of UI elements and a second UI element from said second set of UI elements are to be included in a new user interface of a new application, wherein said first indication is generated upon said developer selecting said first UI element and said second UI element displayed on said display unit; and creating a new specification for said new user interface incorporating the interface definitions of said first UI element and said second UI element, the interface definitions of said first UI element and said second UI element being retrieved respectively from said first specification and said second specification,.

wherein said receiving further receives a second indication that all UI elements of said first user interface are to be included in said new user interface, in response to said second indication, said creating incorporating in said new specification the interface definitions of all of said first set of UI elements retrieved from said first specification.

14. The digital processing system of claim 13, further performing the actions of:

enabling said developer to edit at least one display property of said first UI element to form a modified UI element; and updating said new specification to include the interface definition of said modified UI element.

15. The digital processing system of claim 14, wherein said one display property is one of height, width, color, font and location of said first UI element.

16. The digital processing system of claim 14, further performing the actions of adding said new specification in said plurality of specifications and said new application in said plurality of applications, wherein said displaying displays on said display unit, said new user interface and a fifth user interface of a fifth application of said plurality of applications, said new interface having a fourth set of UI elements including said modified UI element and said fifth user interface having a fifth set of UI elements, wherein said receiving further receives, from said developer, a second indication that said modified UI element from said fourth set of UI elements and a fifth UI element from said fifth set of UI elements are to be included in another new user interface of another new application, wherein said creating creates another new specification for said another new user interface incorporating the interface definitions of said modified UI element and said fifth UI element, the interface definitions of said modified UI element and said fifth UI element being retrieved respectively from said new specification and a fifth specification of said plurality of specifications.

17. The digital processing system of claim 16, wherein said maintaining maintains said plurality of specifications according to extensible markup language (XML).

* * * * *